(12) United States Patent
Fukui et al.

(10) Patent No.: US 9,698,393 B2
(45) Date of Patent: Jul. 4, 2017

(54) BATTERY UNIT OF AUTOMATED GUIDED VEHICLE

(71) Applicant: NISSAN MOTOR CO., LTD., Yokohama-shi, Kanagawa (JP)

(72) Inventors: Toshihito Fukui, Machida (JP); Mitsuru Hirayama, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/418,263

(22) PCT Filed: Jul. 31, 2013

(86) PCT No.: PCT/JP2013/070739
§ 371 (c)(1),
(2) Date: Jan. 29, 2015

(87) PCT Pub. No.: WO2014/021379
PCT Pub. Date: Feb. 6, 2014

(65) Prior Publication Data
US 2015/0243949 A1    Aug. 27, 2015

(30) Foreign Application Priority Data

Aug. 2, 2012  (JP) ................. 2012-171715

(51) Int. Cl.
*H01M 2/10*   (2006.01)
*H01M 10/42*  (2006.01)
(Continued)

(52) U.S. Cl.
CPC ....... *H01M 2/1083* (2013.01); *B60L 11/1816* (2013.01); *B60L 11/1879* (2013.01);
(Continued)

(58) Field of Classification Search
CPC ............. H01M 2/1083; H01M 10/482; H01M 10/0525; H01M 10/425; H01M 10/052;
(Continued)

(56) References Cited

U.S. PATENT DOCUMENTS

2006/0246350 A1* 11/2006 Takayama ............. B60L 3/0046
429/178
2007/0017720 A1    1/2007 Fujii et al.
(Continued)

FOREIGN PATENT DOCUMENTS

EP    1 710 859 A1    10/2006
EP    2 070 754 A1    6/2009
(Continued)

OTHER PUBLICATIONS

Merriam Webster, online dictionary, Bracket entry: ({http://www.merriam-webster.com/dictionary/bracket} printed Oct. 26, 2015).*

*Primary Examiner* — Patrick Ryan
*Assistant Examiner* — Aaron Greso
(74) *Attorney, Agent, or Firm* — Foley & Lardner LLP

(57) ABSTRACT

A battery unit of an automated guided vehicle comprises a casing installed in a chassis of the automated guided vehicle, a battery housed in the casing, a control panel housed in the casing to monitor a charge and discharge state of the battery, and electric components housed in the casing and electrically connected to the battery. The battery is arranged in the casing such that a battery bottom surface is separated from the casing bottom surface.

6 Claims, 8 Drawing Sheets

(51) Int. Cl.
  *H01M 10/0525* (2010.01)
  *H01M 10/052* (2010.01)
  *B60L 11/18* (2006.01)
  *H01M 10/48* (2006.01)

(52) U.S. Cl.
  CPC ..... *H01M 10/0525* (2013.01); *H01M 10/425* (2013.01); *H01M 10/482* (2013.01); *H01M 10/052* (2013.01); *H01M 2010/4271* (2013.01); *H01M 2220/20* (2013.01); *Y02E 60/122* (2013.01); *Y02T 10/7011* (2013.01)

(58) Field of Classification Search
  CPC ...... H01M 2220/20; H01M 2010/4271; B60L 11/1879; B60L 11/1816; Y02E 60/122; Y02T 10/7011
  See application file for complete search history.

(56) References Cited

U.S. PATENT DOCUMENTS

2008/0053716 A1* 3/2008 Scheucher .......... B60L 11/1861
  180/2.1
2009/0152034 A1 6/2009 Takasaki et al.
2009/0167077 A1 7/2009 Tsuchiya et al.
2009/0239136 A1 9/2009 Nagamine et al.
2011/0151308 A1* 6/2011 Yoon .................. H01M 2/1077
  429/151

FOREIGN PATENT DOCUMENTS

| | | |
|---|---|---|
| JP | 2-26936 U | 2/1990 |
| JP | 3-37967 A | 2/1991 |
| JP | 2006-24445 A | 1/2006 |
| JP | 2006-313733 A | 11/2006 |
| JP | 2007-074800 A | 3/2007 |
| JP | 2007-250515 A | 9/2007 |
| JP | 2008-277050 A | 11/2008 |
| JP | 2009-143446 A | 7/2009 |
| JP | 2010-102896 A | 5/2010 |
| KR | 10-2006-0091948 | 8/2006 |
| WO | WO 2007/145304 A1 | 12/2007 |
| WO | WO 2008/035873 A1 | 3/2008 |
| WO | WO 2013/061385 A1 | 5/2013 |

* cited by examiner

BATTERY UNIT OF AUTOMATED GUIDED VEHICLE

TECHNICAL FIELD

This invention relates to a battery unit of an automated guided vehicle that uses a battery as a power supply.

BACKGROUND ART

In general, a lead storage battery is employed as a driving source of a motor in an automated guided vehicle used in a factory or a depot. In the technique discussed in JP 1991-37967 A, an automated guided vehicle is disclosed, which is used after a battery of the automated guided vehicle is fully charged in a charging station provided in a factory or a depot. In addition, in the technique discussed in JP 2007-74800 A, a lithium ion battery that can be partially charged instead of the full charging is used as a battery of the automated guided vehicle.

In the automated guided vehicle discussed in JP 2007-74800 A, the automated guided vehicle travels by virtue of electric power of the lithium ion battery. The battery of the automated guided vehicle is charged in the charging station included in a battery charge and discharge management system. In the charging station, the charging operation starts when a remaining capacity of the battery reaches a charging start capacity. The charging operation stops when the remaining capacity of the battery reaches a charging stop capacity.

In an automated guided vehicle that uses a lithium ion battery as a battery, a battery unit is configured by integrating and housing a battery, a control panel such as a charge and discharge monitor that monitors a charge and discharge condition of the battery, and other electric components in a battery casing. In such a battery unit, dew condensation may occur on an inner surface of the battery casing depending on a weather condition such as humidity or temperature inside the battery casing. An electric failure may occur if a droplet of dew flows down along the inner surface of the battery casing and is attached on the battery, the electric component, and the like.

SUMMARY OF INVENTION

This invention provides a battery unit of an automated guided vehicle capable of avoiding droplets of dew inside the battery casing from being attached onto the battery or the electric components.

According to an aspect of this invention, there is provided a battery unit of an automated guided vehicle comprising a casing installed in the automated guided vehicle body, a battery housed in the casing, a control panel included in a charge and discharge monitor housed in the casing to monitor a charge and discharge state of the battery, and electric components housed in the casing and electrically connected to the battery. The battery is arranged in the casing such that the battery bottom surface is separated from the casing bottom surface.

DESCRIPTION OF EMBODIMENTS

Hereinafter, a battery unit of an automated guided vehicle according to this embodiment will be described with reference to the accompanying drawings.

Figure 1:
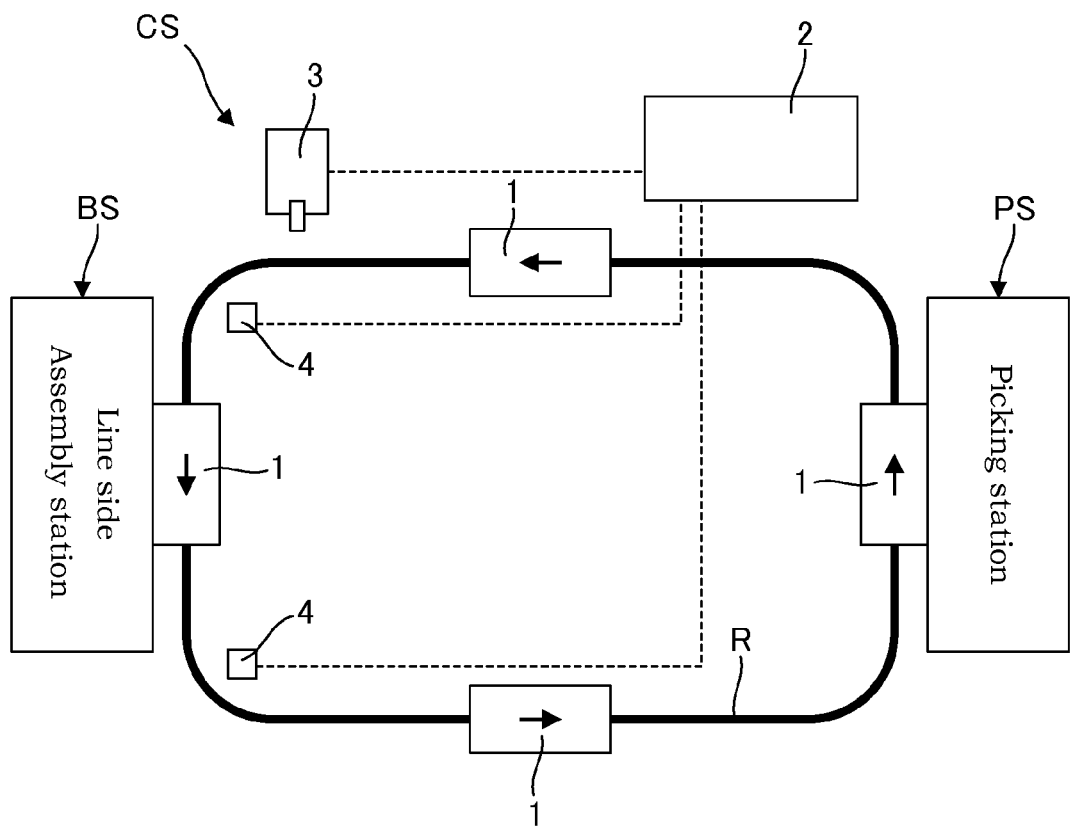
FIG. 1 is a diagram illustrating a traveling route of an automated guided vehicle according to an embodiment of this disclosure.

Referring to FIG. 1, the automated guided vehicle 1 travels along a travel route R of an orbiting track set to pass through a picking station PS where components are stored and an assembly station BS of a production line. Since the automated guided vehicle 1 travels by detecting the travel route R using a tracking sensor mounted on a vehicle, an unmanned travel can be performed.

In the picking station PS, components necessary in the assembly station BS are loaded on the automated guided vehicle 1. The automated guided vehicle 1 travels along the travel route R to deliver the loaded components to the assembly station BS. In the assembly station BS, the components loaded on the automated guided vehicle 1 are unloaded. Then, the automated guided vehicle 1 returns to the picking station PS by traveling along the travel route R again. In this manner, the automated guided vehicle 1 circulates between the picking station PS and the assembly station BS. A charging station CS is arranged outside the travel route R of the orbiting track between the picking station PS and the assembly station BS.

The charging station CS comprises an equipment-side control device 2 and an automatic charger 3 controlled by the equipment-side control device 2. In addition, a terrestrial station 4 that transmits or receives signals between the automated guided vehicle 1 and the equipment-side control device 2 is provided in inlet and outlet positions of the assembly station BS inside the travel route R.

Figure 2:
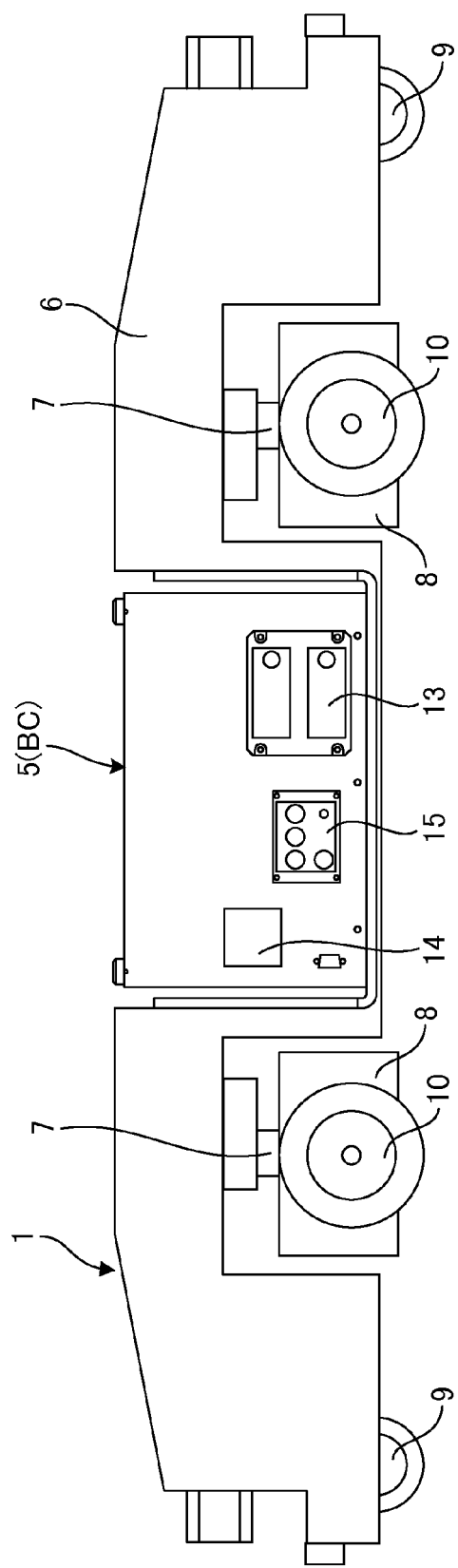
FIG. 2 is a schematic diagram illustrating the automated guided vehicle according to this embodiment.

Referring to FIG. 2, the automated guided vehicle 1 comprises a vehicle body 6, caster wheels 9 arranged under four corners of the vehicle body 6, a pair of spindles 7 vertically extending toward a floor surface from front and rear lower sides of the vehicle body 6, a driving unit 8 provided in the spindle 7 so as to be pivoted, a driving wheel 10 arranged to adjoin the driving unit 8, and a controller (not illustrated) that controls the driving unit 8.

The caster wheel 9 is a traveling wheel for supporting a weight of the vehicle and is configured to pivot to follow a movement direction of the vehicle. The driving unit 8 is provided to rotate around a shaft of the spindle 7, and driving wheels 10 are arranged in both left and right sides of the driving unit 8. A pair of driving wheels 10 are arranged for a single driving unit 8. The driving wheels 10 are independently driven by a pair of driving motors embedded in the driving unit 8. It is noted that brackets are provided in front and rear sides of the driving unit 8, and tracking sensors (not illustrated) for detecting a travel route R are installed in the brackets.

A battery B as a power supply for driving the driving motor of the driving unit 8 is mounted on a center position of the vehicle body 6 while it is housed in a battery casing BC of the battery unit 5.

Figure 3:
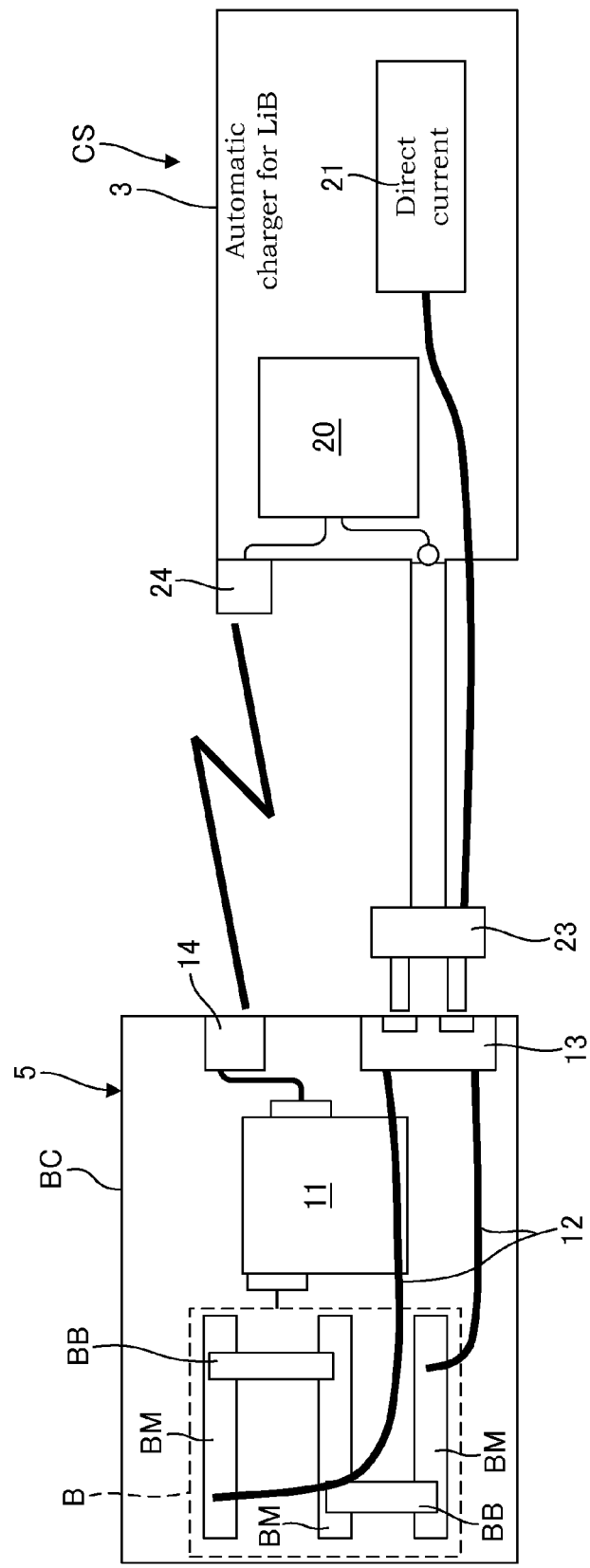
FIG. 3 is a diagram illustrating connection between a battery unit of the automated guided vehicle and a charging station during a charging operation.

Referring to FIG. 3, a battery casing BC houses the battery B as a lithium ion secondary battery and electric components such as a power relay for supplying electric power of the battery B to the driving motors of each driving unit 8. In addition, the battery casing BC also houses a charge and discharge monitor 11 for monitoring a condition of the battery B, a control panel 11A of the charge and discharge monitor 11 (refer to FIG. 7), a communication means 14 for transmitting or receiving signals to/from the automatic charger 3 or the terrestrial station 4 of the equipment-side control device 2, and the like.

The battery B is composed of three battery modules BM, and the battery modules BM are connected in series through a busbar BB. The number of battery modules BM is not limited to three, but may be set arbitrarily as necessary. The battery module BM is formed by connecting a plurality of unit cells in series. According to this embodiment, the battery B consists of three battery modules BM, and an output voltage of the battery B in a full charging state reaches approximately 25 V.

A receiving contactor 13 is provided in an end portion of a feed line 12 of the battery B. The receiving contactor 13 is installed on a casing wall surface of the battery casing BC so as to be exposed to the outside. The battery B is charged by connecting a feeding contactor 23 of the automatic charger 3 of the charging station CS to the receiving contactor 13. It is noted that the feeding contactor 23 is formed in an expandable/contractible manner with respect to the automatic charger 3.

The charge and discharge monitor 11 monitors and stores various battery condition information, such as a charging capacity (battery voltage) of the battery B, a charging capacity (cell voltage) of each unit cell, a charging capacity of each battery module BM, an input/output current amount of the battery B, and a history of failure in the battery B, at a predetermined time interval (for example, 10 msec) and displays the battery condition information. The charge and discharge monitor 11 transmits the battery condition information to the equipment-side control device 2 or the automatic charger 3 via a communication means 14 provided on a casing wall surface of the battery casing BC so as to be exposed to the outside. The communication means 14 of the battery unit 5, the communication means 24 of the automatic charger 3, and the terrestrial station 4 of the equipment-side control device 2 transmit/receive information based on a communication method such as optical communication.

If the charging capacity (voltage) of each battery module BM of the battery B becomes equal to or lower than a shutdown threshold value (for example, 2.8 to 3 V), so that an overdischarge state is determined, the charge and discharge monitor 11 displays that the battery B has an abnormal state and abnormally stops the automated guided vehicle 1. The shutdown threshold value is a threshold value that changes depending on a travel condition of the automated guided vehicle 1 and the like, and is typically set to 3.0 V. However, when the automated guided vehicle 1 passes through the assembly station BS of the travel route R, the shutdown threshold value is set to a setting value lower than 3.0 V, for example, 2.8 V.

That is, the charge and discharge monitor 11 changes the shutdown threshold value from 3.0 V to 2.8 V when a shut-down prohibition command transmitted from the terrestrial station 4 installed in the inlet position of the assembly station BS is received by the communication means 14. In addition, the charge and discharge monitor 11 changes the shutdown threshold value from 2.8 V to 3.0 V when a shut-down prohibition release command transmitted from the terrestrial station 4 installed in the outlet position of the assembly station BS is received by the communication means 14. In this manner, by changing the shutdown threshold value, it is possible to suppress frequency of the abnormal stop of the automated guided vehicle 1 within the area of the assembly station BS.

Since the automated guided vehicle 1 travels using electric power of the battery B, the charging capacity (battery voltage) of the battery B is lowered as much as the automated guided vehicle 1 travels. For this reason, the battery B is charged using the automatic charger 3 by temporarily parking the automated guided vehicle 1 in the charging station CS. As illustrated in FIG. 3, the automatic charger 3 comprises a DC power supply 21 capable of boosting a voltage to an upper limit voltage of the battery B (for example, 25.02V), a charging control device 20 that controls a charged current value and a charged voltage value supplied from the DC power supply 21 to the battery B, and a communication means 24 capable of performing communication with the communication means 14 of the automated guided vehicle 1. The communication means 24 exchanges various battery condition information with the communication means 14 of the automated guided vehicle 1.

Whether or not the charging is performed is determined based on the voltage of the battery B of the automated guided vehicle 1. More specifically, the charging station CS determines whether or not the current voltage of the battery B needs to be charged, that is, whether or not the battery voltage is lower than a charging needlessness threshold voltage. If it is determined that the charging is necessary, the battery B of the automated guided vehicle 1 is charged by the automatic charger 3.

The charging needlessness threshold voltage is set to voltage between an overcharge voltage and an overdischarge voltage of the battery B, for example, 24.9 V. It is determined that the battery B needs to be charged when the battery voltage of the battery B is lower than the charging needlessness threshold voltage set in this manner. It is determined that the battery B does not need to be charged when the battery voltage is higher than the charging needlessness threshold voltage. It is noted that by sufficiently increasing a voltage difference between the overdischarge voltage and the charging needlessness threshold voltage, it is possible to prevent overdischarging of the battery B and protect the battery B.

When the battery B is charged, the feeding contactor 23 and the receiving contactor 13 are connected to each other by extending the feeding contactor 23 of the automatic charger 3 toward the receiving contactor 13 of the automated guided vehicle 1. In this manner, by connecting the feeding contactor 23 and the receiving contactor 13, the charging electric power is supplied to the battery B from the DC power supply 21 of the automatic charger 3. The charging control device 20 is configured to be able to execute both a normal constant-current/constant-voltage charging mode and a fast constant-current/constant-voltage charging mode in which a larger charging current than that of the normal charging mode flows to the battery B. The fast charging mode is suitable for a battery charging operation of the automated guided vehicle 1 necessary to be charged within a short time. According to this embodiment, the charging control device 20 executes the fast charging mode.

The charging control device 20 may also stop the charging operation before the battery B is fully charged. For example, the charging control device 20 performs a partial charging mode in which the charging of the battery B stops when the battery voltage of the automated guided vehicle 1 rises to the charging needlessness threshold voltage. In addition, the charging control device 20 performs a partial charging mode in which the constant-current/constant-voltage charging mode is performed only for a predetermined time period, and the charging operation to the battery B stops when the predetermined time period elapses.

In the battery unit 5 mounted on the automated guided vehicle 1, dew condensation may occur on an inner surface of the battery casing BC depending on a weather condition such as humidity and temperature inside the battery casing BC. If a droplet of dew flows down along the inner surface of the battery casing BC and is attached onto the battery B or electric components, an electric failure may occur.

For this reason, the battery unit 5 of the automated guided vehicle 1 according to this embodiment is configured to avoid attachment of a droplet of dew inside the battery casing BC from being attached onto the battery B, electric components, and the like.

Figure 4:
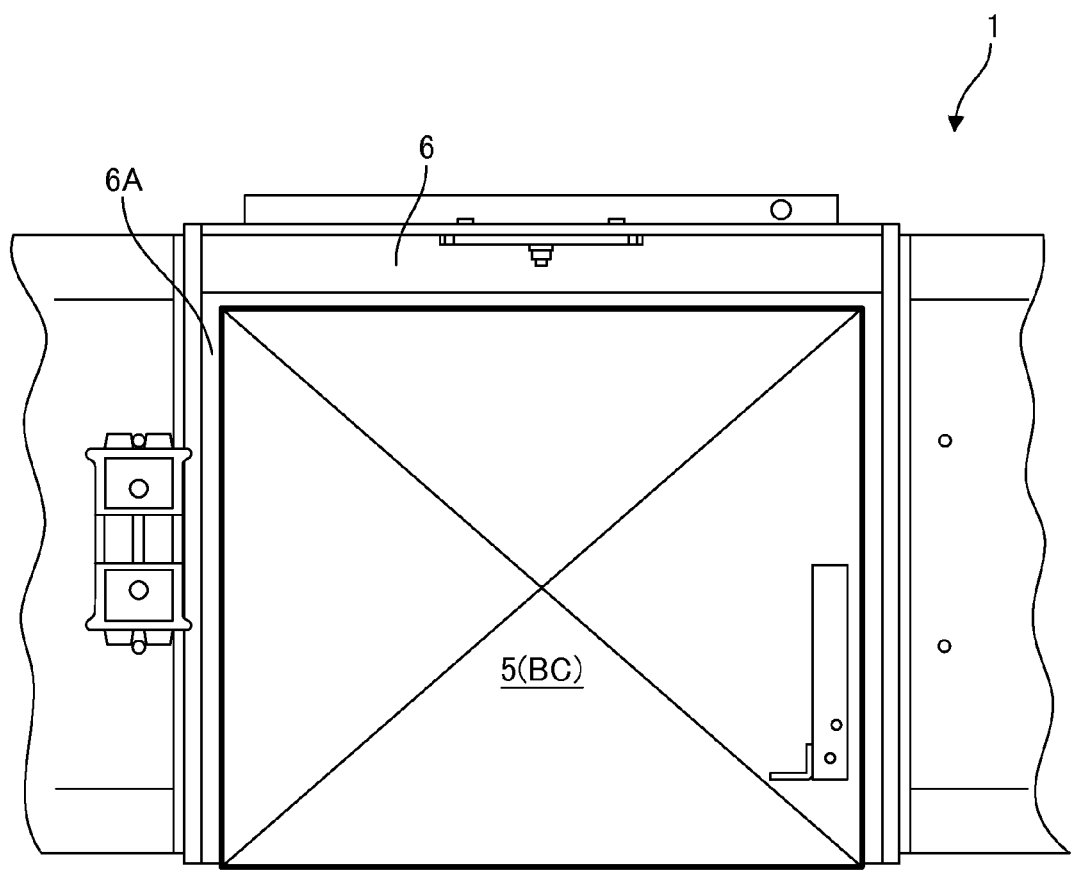
FIG. 4 is a plan view illustrating a battery unit mounted on the automated guided vehicle.

FIG. 4 is a plan view illustrating appearance of the battery unit 5 mounted on the vehicle body 6 of the automated guided vehicle 1.

Referring to FIG. 4, a mount space 6A partitioned by a vehicle body frame extending along a front-rear direction of the vehicle is formed in the center position of the vehicle body 6 of the automated guided vehicle 1. The battery unit 5 is housed in this mount space 6A. The battery unit 5 is fixed to the mount space 6A using a fixing means (not illustrated). The battery unit 5 has the battery casing BC, and the battery casing BC is formed in a box shape by the casing walls.

Figure 5:
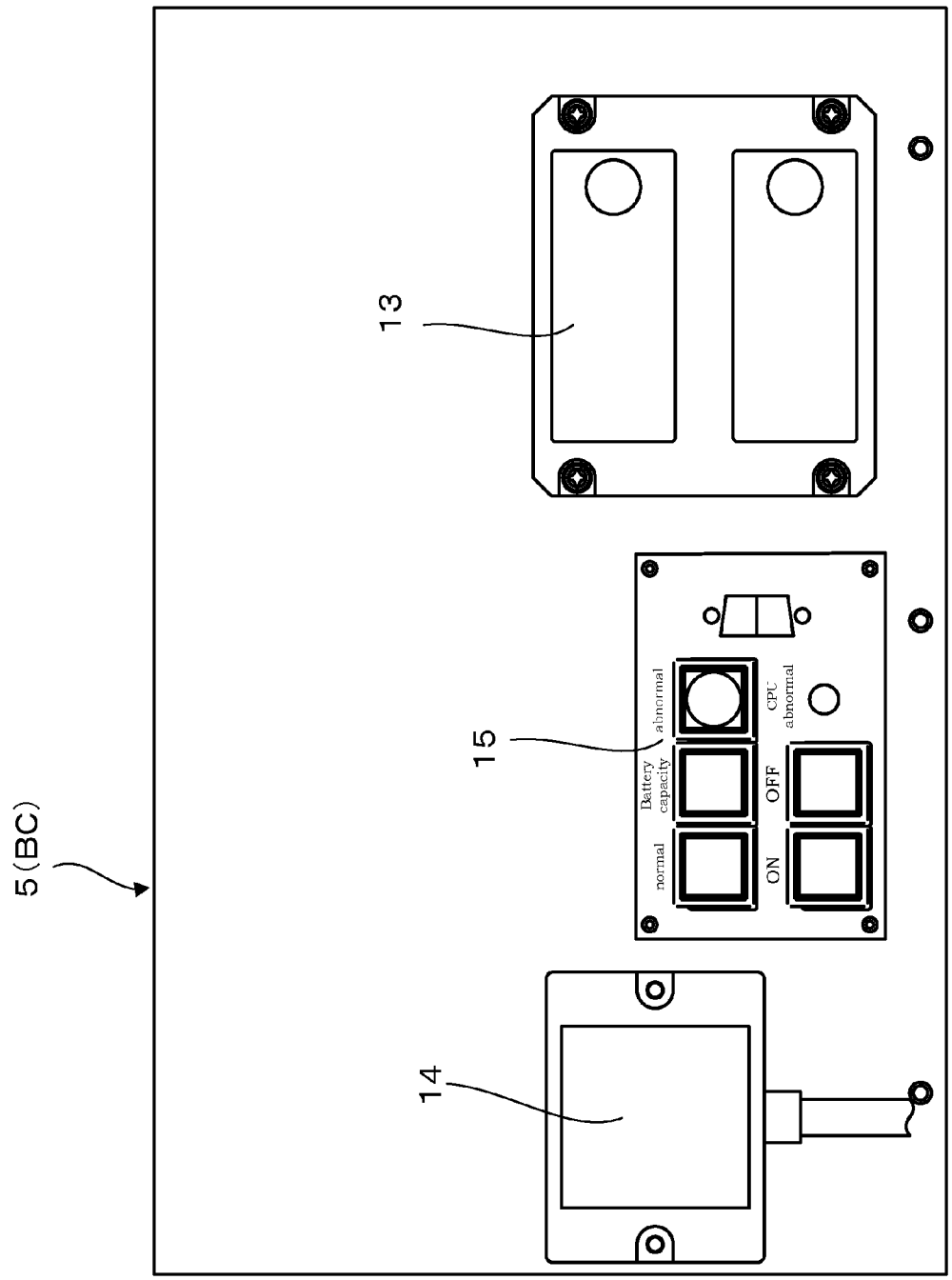
FIG. 5 is a side view illustrating the battery unit.

It is noted that the casing wall of the battery casing BC in the right side of the vehicle (casing side wall surface), facing the automatic charger 3 during the charging operation, is exposed to the outside from the mount space 6A of the vehicle body 6 as illustrated in FIG. 5. The receiving contactor 13, the communication means 14, and the display unit 15 for displaying a condition of the battery B are arranged on the casing side wall surface of the battery casing BC in an exposed state.

Figure 6:
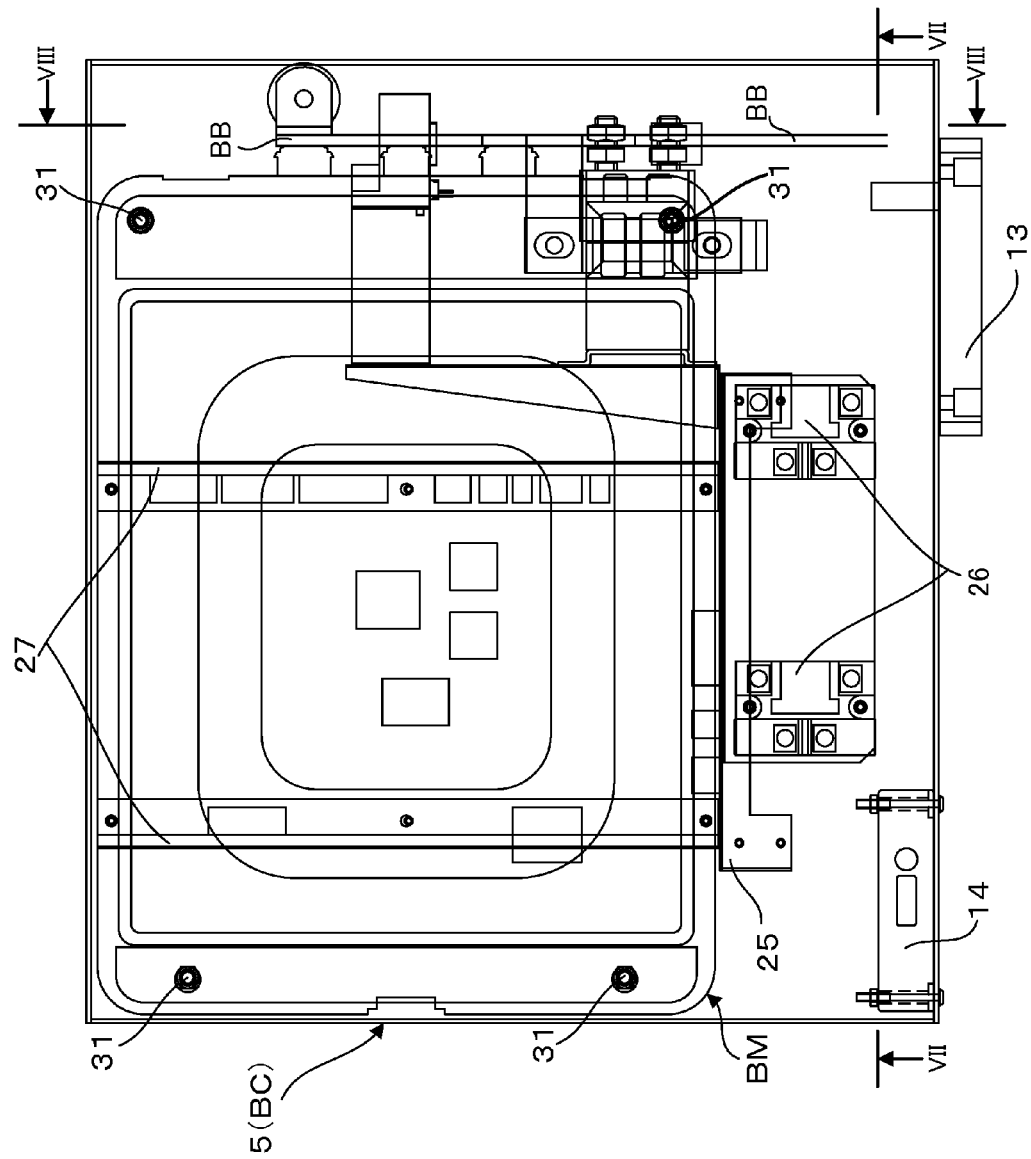
FIG. 6 is a plan view illustrating the battery unit.
Figure 7:
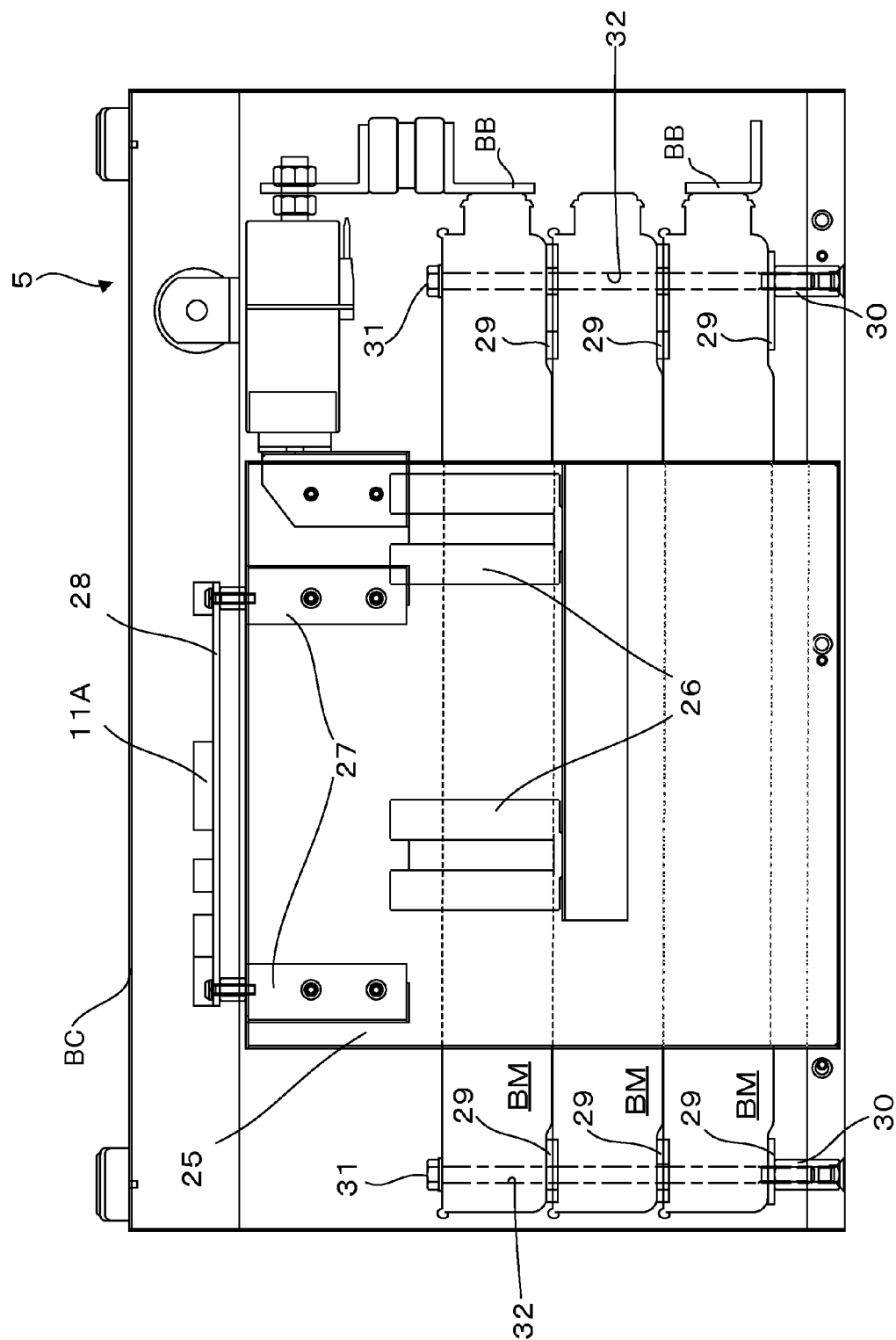
FIG. 7 is a cross-sectional view taken along a line VII-VII of FIG. 6.

Referring to FIGS. 6 and 7, a vertical wall bracket 25 as a vertical wall for partitioning an inner space is provided inside the battery casing BC. The vertical wall bracket 25 is a wall member fixed to the bottom surface of the battery casing BC to be erected in a perpendicular direction, and extends along a front-rear direction of the vehicle. The battery modules BM of the battery B are vertically arranged side by side in an area inside the battery casing BC far from the vertical wall bracket 25 (an area farther from the casing side wall surface out of the areas partitioned by the vertical wall bracket 25). Meanwhile, electric components such as the receiving contactor 13, the communication means 14, the display unit 15, and the power relay 26 are arranged in an area inside the battery casing BC in a near side from the vertical wall bracket 25 (an area close to the casing side wall surface out of the areas partitioned by the vertical wall bracket 25) in a position distant from the bottom surface of the battery casing BC.

Figure 8:
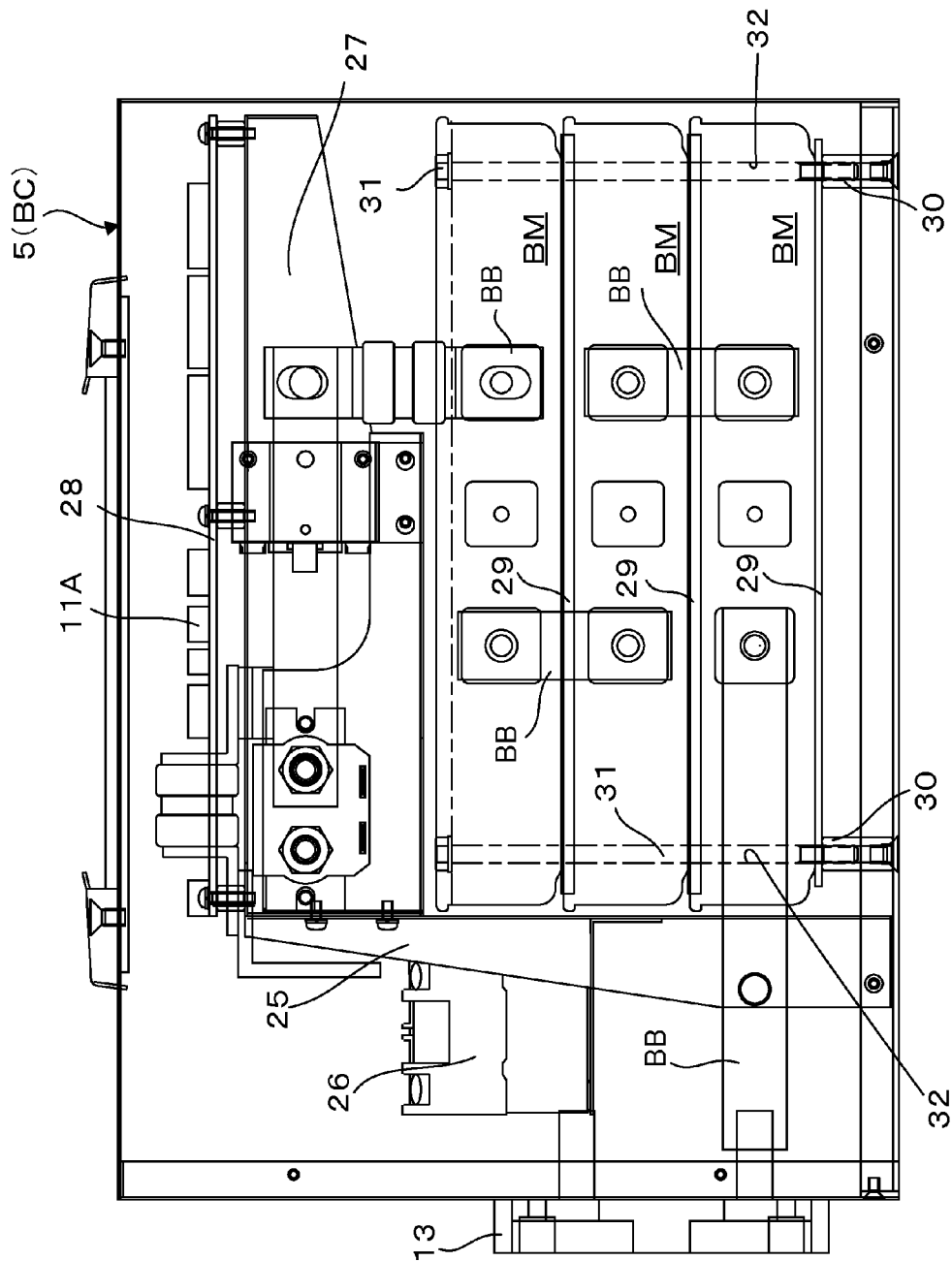
FIG. 8 is a cross-sectional view taken along a line VIII-VIII of FIG. 6.

Referring to FIGS. 7 and 8, a pair of horizontal beam brackets 27 are provided over the vertical wall bracket 25. A pair of horizontal beam brackets 27 are arranged in parallel to each other with a predetermined distance in a front-rear direction of the vehicle. A base end portion of the horizontal beam bracket 27 is fixed to an upper portion of the vertical wall bracket 25, and a leading end of the horizontal beam bracket 27 extends to a farther side of the battery casing BC. A single support plate 28 is provided on upper surfaces of the pair of horizontal beam brackets 27. A control panel 11A and the like included in the charge and discharge monitor 11 are placed on the upper surface of the support plate 28. It is noted that the battery modules BM are arranged under the horizontal beam bracket 27, and the support plate 28 is configured to cover the upper side of the battery B.

Three battery modules BM are vertically stacked. Spacers 29 are interposed between the front side ends and the rear side ends of the vertically neighboring battery modules BM. Since each battery module BM is stacked by interposing the spacer 29, a gap is formed between the neighboring battery modules BM. Due to this gap, thermal expansion of a stacking direction caused by a temperature increase generated by charging or discharging the battery modules BM is allowed. In addition, since the air flows through the gap between the battery modules BM, it is possible to promote dissipation of the heat caused by a temperature increase of the battery modules BM.

A collar sleeve 30 is arranged between a lower surface (bottom surface) of the lowermost battery module BM and the bottom surface of the battery casing BC, so that the lower surface of the lowermost battery module BM is arranged to float over the bottom surface of the battery casing BC. The three battery modules BM have vertically penetrating fixing holes 32, so that the battery modules BM and the battery casing BC are fixed using fixing bolts 31 penetrating the collar sleeve 30 and the fixing holes 32 of each battery module BM.

Referring to FIG. 8, the stacked battery modules BM are electrically connected to a busbar BB, and the busbar BB connected to output terminals of the uppermost and lowermost battery modules BM is connected to the receiving contactor 13. It is noted that the busbar BB used to connect the output terminals of the uppermost and lowermost battery modules BM and the receiving contactor 13 is configured to feed electric power to the driving unit 8 through the power relay 26 although a part thereof is not illustrated.

In the battery unit 5 of the automated guided vehicle 1 described above, dew condensation may occur on the inner surface of the battery casing BC depending on an ambient temperature change of the battery casing BC or a condition such as humidity inside the battery casing BC. In this regard, in the battery unit 5, the lowermost battery module BM of the battery casing BC is arranged to float over the casing bottom surface using the collar sleeve 30. For this reason, even when droplets of dew generated on the inner surface of the battery casing BC are accumulated on the casing bottom surface along the inner surface of the battery casing BC, it is possible to prevent droplets of dew from being attached onto the battery module BM. In addition, it is possible to dry droplets of dew accumulated on the casing bottom surface using the heat generated from the battery module BM.

In the battery unit 5 of the automated guided vehicle 1, electric components such as the power relay 26, the communication means 14, and the display unit 15 or the control panel 11A are also arranged in a position separated from the bottom surface of the battery casing BC. Therefore, it is possible to prevent droplets of dew from being attached onto such electric components and the like.

In the battery unit 5 of the automated guided vehicle 1, the battery module BM constituting battery B is arranged in a space defined by the vertical wall bracket 25, the horizontal beam bracket 27, and the support plate 28. For this reason, even when an impact is applied from the outside, particularly, from the lateral surface side of the battery unit 5, it is possible to prevent the electric components such as the power relay 26, the communication means 14, and the display unit 15 arranged in the vertical wall bracket 25 and the control panel 11A arranged in the support plate 28 from making contact with the battery modules BM. In this manner, it is possible to protect the battery modules BM using the vertical wall bracket 25, the horizontal beam bracket 27, and the support plate 28 and prevent a damage in the battery modules BM.

In battery unit 5 of the automated guided vehicle 1, the vertical wall bracket 25, the horizontal beam bracket 27, and the support plate 28 serve as a partitioning wall for partitioning a space for the battery modules BM and a space for the electric components such as the power relay 26 and the control panel 11A. Therefore, it is possible to prevent a temperature change of the battery modules BM from affecting the electric components or the control panel 11A.

The following effects can be obtained using the battery unit 5 of the automated guided vehicle 1 according to this embodiment described above.

(I) The battery unit 5 of the automated guided vehicle 1 comprises the battery B, the control panel 11A of the charge and discharge monitor 11 for monitoring a charge and discharge condition of the battery B, the electric components such as the power relay 26 electrically connected to the battery B, and the battery casing BC for housing these components. The battery B is arranged inside the battery casing BC such that its bottom surface is separated from the bottom surface of the battery casing BC. As a result, even when droplets of dew generated inside the battery casing BC are accumulated on the casing bottom surface, it is possible to prevent the droplets of dew from being attached onto the battery B and the like. In addition, using the heat generated from the battery B, it is possible to dry the droplets of dew accumulated on the casing bottom surface.

(II) The battery B is configured by stacking a plurality of battery modules BM, and the spacer 29 is interposed to form a gap between the vertically neighboring battery modules BM. As a result, thermal expansion in a stacking direction caused by a temperature increase generated by the charging or discharging operation of the battery modules BM is allowed. In addition, since the air flows through the gap between battery modules BM, it is possible to promote dissipation of the heat caused by a temperature increase of the battery modules BM.

(III) The casing wall surface (lateral wall surface) of the battery casing BC in the lateral side of the automated guided vehicle 1 is exposed to the outside from the mount space 6A of the vehicle body 6, and the vertical wall bracket 25 erected from the casing bottom surface is provided to face the lateral side wall inside the battery casing BC. The battery B is arranged in a far side of the battery casing BC from the vertical wall bracket 25, and the electric components are arranged in a near side from the vertical wall bracket 25. For this reason, even when an impact is applied from the lateral wall surface of the battery casing BC exposed to the outside, it is possible to prevent the electric components such as the power relay 26 arranged in the vertical wall bracket 25 from making contact with the battery modules BM. For this reason, it is possible to prevent a damage in the battery modules BM and protect the battery modules BM. Furthermore, it is possible to prevent a temperature change of the battery modules BM from affecting the electric components and the control panel 11A.

(IV) The horizontal beam bracket 27 is provided over the vertical wall bracket 25, and the support plate 28 that covers an upper side of the battery B is arranged in the horizontal beam bracket 27. The control panel 11A of the charge and discharge monitor 11 is placed on the upper surface of the support plate 28. For this reason, even when an impact is applied from the lateral wall surface of the battery casing BC exposed to the outside, it is possible to prevent the control panel 11A arranged on the support plate 28 from making contact with the battery module BM. Accordingly, it is possible to prevent a damage in the battery modules BM and protect the battery modules BM. In addition, it is possible to prevent a temperature change of the battery modules BM from affecting the control panel 11A.

(V) The charge and discharge monitor 11 monitors a voltage of the battery modules BM of the battery B. When a voltage of any one of the battery modules BM becomes equal to or lower than a predetermined setting voltage, the charge and discharge monitor 11 displays the abnormal state of the battery B and abnormally stops the automated guided vehicle 1. When the automated guided vehicle 1 travels within the area of the assembly station BS, the setting voltage value is lowered, compared to a case where it travels other areas. For this reason, while the automated guided vehicle 1 travels within the area of the assembly station BS, it is possible to suppress frequency of the abnormal stop of the automated guided vehicle 1.

Although embodiments of this invention have been described hereinbefore, the aforementioned embodiments are just a part of applications of this invention, and are not intended to limit the technical scope of this invention to specific configurations of the aforementioned embodiments.

This application is based on and claims priority to Japanese Patent Application No. 2012-171715, filed in Japan Patent Office on Aug. 2, 2012, the entire content of which is incorporated herein by reference.

The invention claimed is:

1. A battery unit of an automated guided vehicle, comprising
    a casing installed in a vehicle body of the automated guided vehicle,
    a battery that is housed in the casing and has a hole penetrating in a vertical direction,
    a control panel housed in the casing and included in a monitor to monitor battery condition information,
    electric components housed in the casing and electrically connected to the battery,
    a sleeve located between the battery and a bottom of the casing such that the battery is separated from the bottom of the casing, and
    a bolt used to fix the battery to the casing while the bolt penetrates the hole of the battery and the sleeve, wherein
    the casing is formed in a box shape by casing walls, the casing being arranged in the automated guided vehicle such that a casing wall facing a charger during a charging operation is exposed to an outside of the vehicle body,
    a vertical wall is arranged inside the casing to face the casing wall facing the charger, the vertical wall being erected from the bottom of the casing so as to partition an inner area of the casing,
    the battery is arranged in a back side area of the casing from the vertical wall, the electric components are arranged in a front side area of the casing from the vertical wall, the electric components being arranged in a position separated from the bottom of the casing, a horizontal beam bracket is fixed to an upper side of the vertical wall, a support plate is provided on the horizontal beam bracket and arranged to cover an upper side of the battery, and the control panel is arranged on an upper surface of the support plate.

2. The battery unit of the automated guided vehicle according to claim 1, wherein the battery comprises a stack of a plurality of battery modules each comprised of a lithium ion battery, and a spacer is interposed between neighboring battery modules such that a gap is formed between the neighboring battery modules.

3. The battery unit of the automated guided vehicle according to claim 1, wherein the sleeve is a cylindrical sleeve.

4. The battery unit of the automated guided vehicle according to claim 1, wherein the sleeve fits over and encloses the bolt.

5. The battery unit of the automated guided vehicle according to claim 2, wherein the sleeve is located between a bottom surface of a lowermost battery module in the stack of the plurality of battery modules and the bottom of the casing such that the lowermost battery module is separated from the bottom of the casing.

6. An automated guided vehicle comprising:
   a vehicle body;
   a plurality of wheels arranged under the vehicle body;
   a plurality of spindles vertically extending toward a floor surface;
   a driving unit provided for each of the spindles;
   a plurality of pairs of driving wheels, each pair of driving wheels driven by a driving motor in a driving unit; and
   the battery unit of claim 1, the battery unit configured to drive the driving motor.

* * * * *